United States Patent [19]
Stahl et al.

[11] Patent Number: 5,925,328
[45] Date of Patent: Jul. 20, 1999

[54] STEAM REFORMING PROCESS

[75] Inventors: Henrk Otto Stahl, Rungsted Kyst; Ib Dybkjær, Coppenhagen; Carsten Lau Laursen, Charlottenlund, all of Denmark

[73] Assignee: Haldor Topsoe A/S, Lyngby, Denmark

[21] Appl. No.: 08/943,066

[22] Filed: Oct. 2, 1997

Related U.S. Application Data

[60] Provisional application No. 60/027,639, Oct. 4, 1996.
[51] Int. Cl.[6] .................................. C01B 3/24; C01B 3/26
[52] U.S. Cl. .......................... 423/650; 252/373; 252/376; 423/651; 423/652
[58] Field of Search ..................................... 423/359, 651, 423/652, 650; 252/373, 376

[56] References Cited
U.S. PATENT DOCUMENTS

| | | | |
|---|---|---|---|
| 4,079,017 | 3/1978 | Crawford et al. | 252/373 |
| 4,822,521 | 4/1989 | Fuderer | 252/373 |
| 5,122,299 | 6/1992 | Leblanc | 252/376 |

*Primary Examiner*—Wayne Langel
*Attorney, Agent, or Firm*—Ostrolenk, Faber, Gerb & Soffen, LLP

[57] ABSTRACT

A process for the preparation of ammonia synthesis gas includes supplying a feedstock gas, optionally mixed with a flue gas, to at least one pair of reforming reactors. Each reactor has a process and fuel side and a combustion side. Each pair of reactors is arranged in parallel on the process and fuel side, and in series on the combustion side. A flame temperature in each pair of reactors is controlled by supplying an excess of combustion air to a first reactor of the pair, and oxygen-depleted combustion air to a second reactor of the pair.

13 Claims, 2 Drawing Sheets

STEAM REFORMING PROCESS

This application claims the benefit of U.S. provisional application Ser. No. 60/027,639, filed Oct. 4, 1996.

BACKGROUND OF THE INVENTION

This invention relates to a process for the preparation of ammonia synthesis gas.

SUMMARY OF THE INVENTION

The present invention provides a process for the preparation of ammonia synthesis gas. The process includes the steps of providing a feedstock stream, optionally mixed with a flue gas so as to obtain a mixed gas, and feeding the feedstock stream or the mixed gas in a split stream to at least one pair of reforming reactors.

Each reactor has a process and fuel side, and a combustion side. Each pair of reactors is arranged in parallel on the process and fuel side, and in series on the combustion side. The flame temperature in each reactor is maintained below about 1400° C. The feedstock gas usually is desulfurized.

The flue gas, to be mixed optionally with the feedstock stream, consists mostly of $CO_2$, $H_2O$, and $N_2$, having been withdrawn from a second of each pair of reactors. The amount of flue gas can be selected so as to obtain a predetermined $H_2/N_2$ ratio in the synthesis gas. The feedstock stream also can be mixed with steam.

The temperature in the first reactor is maintained by supplying air in a large excess, e.g., about 105% excess. Flue gas from the first reactor is supplied as combustion air for a second reactor of each pair of reactors. The flue gas is oxygen depleted, which limits the flame temperature to below about 1400° C. Overall air excess is kept low, to about 5%.

According to a preferred embodiment, the mixed gas is fed to at least two pairs of reactors. Each reactor is connected in parallel on the process gas side. Each pair of reactors is connected to another pair of reactors in series on the combustion side.

The main advantages of the inventive process over the prior art are as follows:

- stoichiometric synthesis gas from $NH_3$-production is produced in a heat exchange reforming reactor without use of enriched air or cryogenic separation of excess nitrogen;
- use of two reforming reactors in series on the combustion air side provides flame temperature control without excessive overall surplus of combustion air;
- release of $NO_x$ from the reforming process to the atmosphere is minimized; release of $SO_2$ is eliminated;
- $CO_2$ and steam formed by the combustion are partly used as reformer feed, reducing overall steam demand; and
- power for compression of combustion air is partly recovered by expansion of excess flue gas.

In addition, steam reforming of feed gas being admixed with nitrogen and carbon dioxide-containing flue gas from a subsequent, heat-exchange, steam-reforming process step provides higher steam reforming conversion rates of carbonhydride feedstock, and thus a lower concentration of unconverted carbonhydrides in the reactor effluent.

In the steam reforming reactor, necessary heat for the endothermic steam reforming reactions is provided by indirect heat exchange with pressurized flue gas.

To provide the flue gas for use in the heat exchanging steam reforming process, fuel is combusted with excess of air in a first heat exchange steam reforming-step air, resulting in lower combustion temperatures in the reactor. Oxygen-containing flue gas is then withdrawn from the first reforming step, intermediately cooled, and further combusted with additional fuel in one or more subsequent reforming steps.

Other features and advantages of the present invention will become apparent from the following description of the invention which refers to the accompanying drawings.

DETAILED DESCRIPTION OF THE INVENTION

Figure 1:
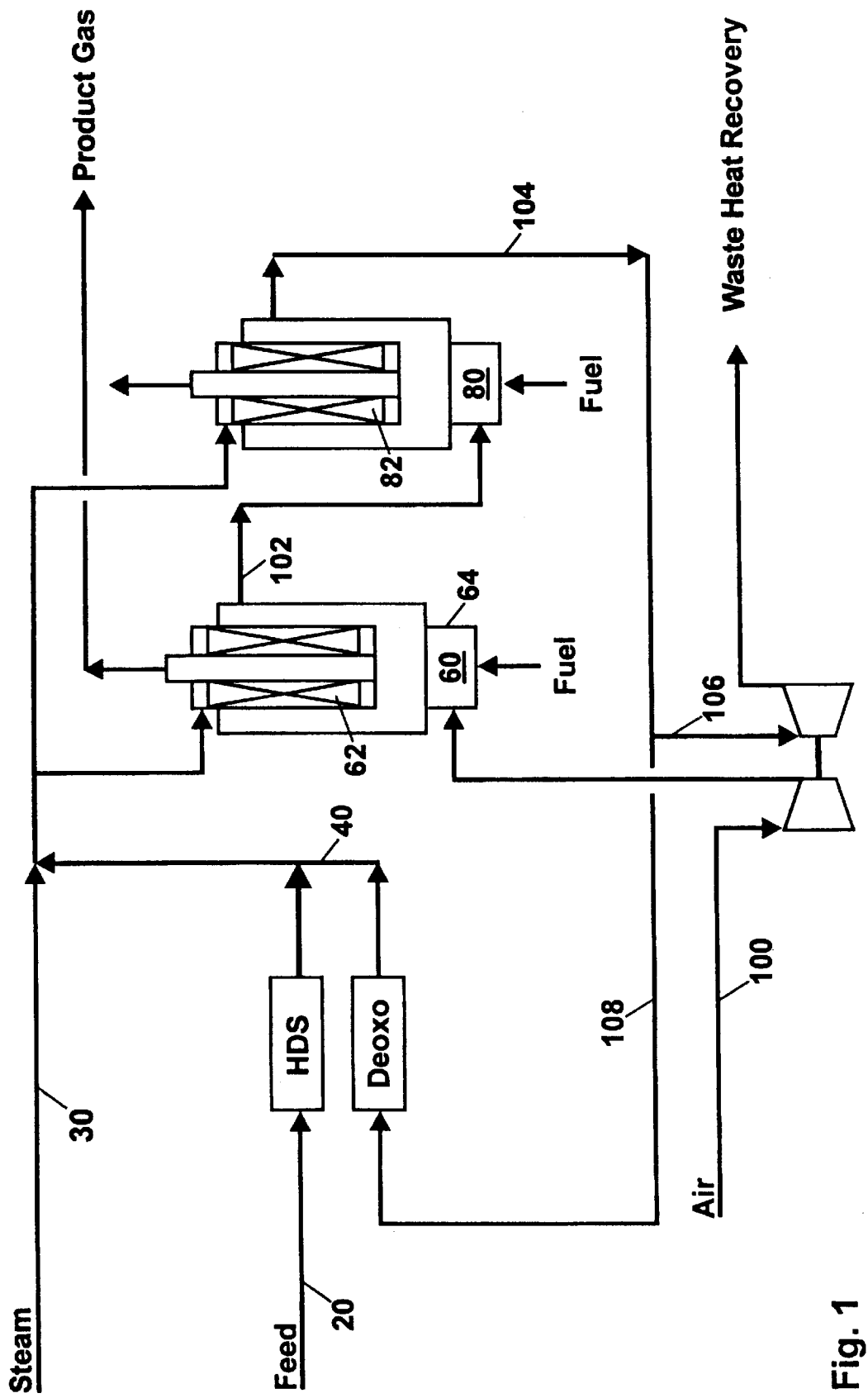
FIG. 1 is a diagram of the process according to the present invention.

Referring to FIG. 1, a simplified form of the process of the present invention is illustrated. Feedstock 20 typically is desulfurized natural gas, split into two streams. The feedstock is mixed with steam 30 and a predetermined amount of deoxygenated, pressurized flue gas 40 (see below) to obtain the correct $H_2/N_2$ ratio desired in the syngas being produced. The gas mixture is used as process gas in two heat exchange reforming reactors 60,80 arranged in parallel on the process and the fuel side and in series on the combustion air side. High exit temperatures from each catalyst bed 62,82, arranged in the reforming reactors, ensure reasonably low $CH_4$-leakage.

Air 100 is compressed to a pressure slightly higher than that of the process gas upstream the heat exchangers. The air is first used as combustion air in the first heat exchange burner 64, which operates on large excess of air (about 105% excess) to keep the flame temperature below 1400° C.

After having exchanged heat with reformer tubes in the first reactor, the pressurized flue gas 102 (at about 600° C.) is further used as combustion air in the second reactor 80. The combustion air is oxygen-depleted, which limits the flame temperature to below about 1400° C., while the overall air excess is kept low, about 5%.

Flue gas 104 from the second reactor is split into two streams 106,108. Stream 106 is expanded to provide part of the power required for air compression. The residual amount of flue gas 108 is passed to a deoxygenator for removal of remaining traces of oxygen and further to the feed stream to the reactors as described above.

Figure 2:
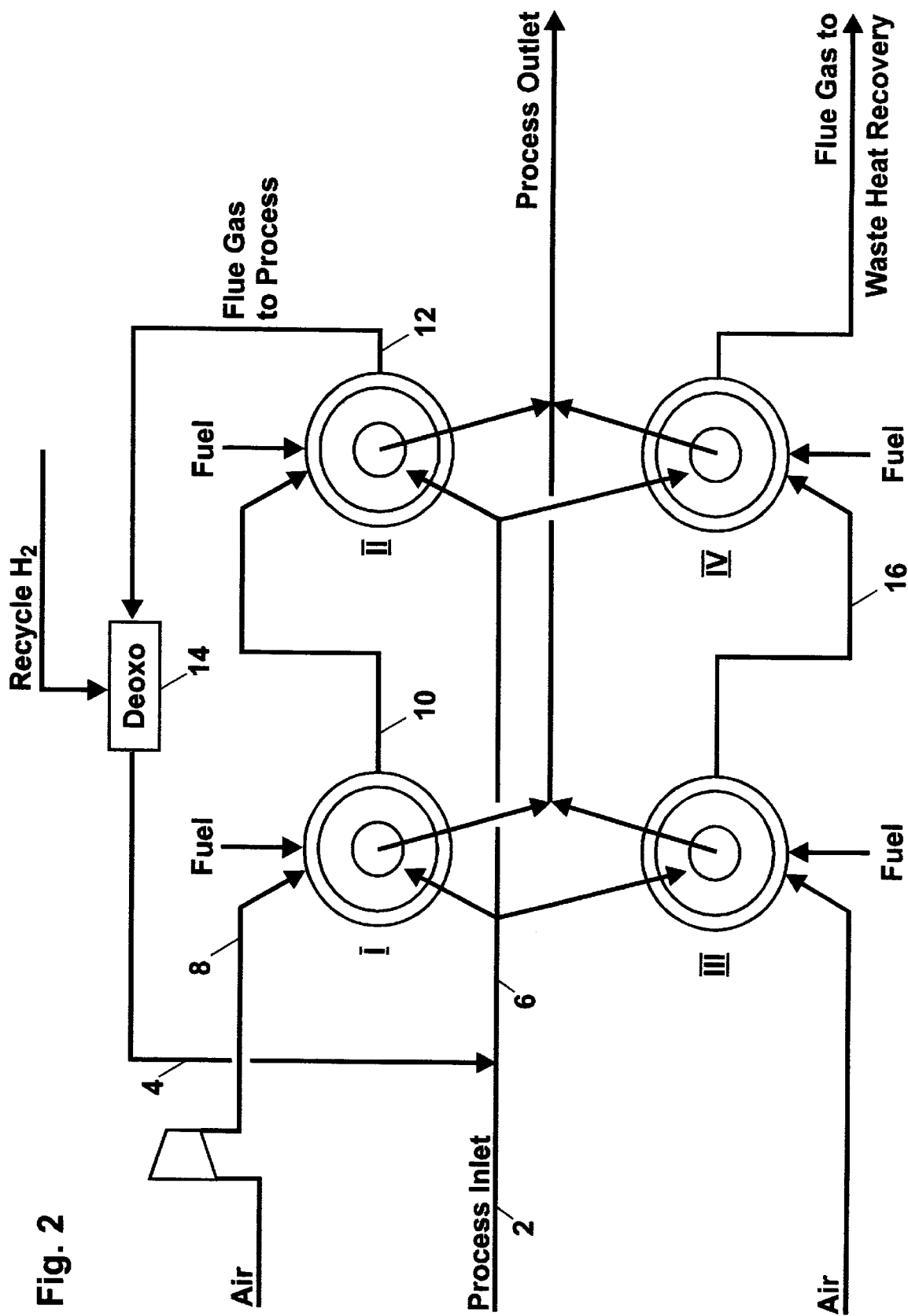
FIG. 2 is a diagram of an alternative embodiment of the process of the present invention.

Referring to FIG. 2, a further specific embodiment of the invention is illustrated, according to which methane in a process gas is steam reformed in four, heat-exchange, steam-reforming reactors I, II, III and IV.

The reformers are of the conventional bayonet tube type with an inner tube coaxially arranged in an outer sheath tube. Steam reforming catalyst is loaded in an annular space defined between the walls of the inner tube and the outer tube. Necessary heat for the endothermic steam reforming reactions proceeding in the process gas is thereby provided by hot flue gas passing externally along the wall of the sheath tube.

Prior to introduction of process gas 2, the gas is mixed with flue gas 4 consisting mainly of $CO_2$, $H_2O$ and $N_2$. Flue gas 4 is withdrawn from reactor II after having supplied heat to the steam reforming reactions proceeding in the reactor. Flue gas 4 is admixed into the process gas in an amount to obtain the required $N_2/H_2$ ratio to the synthesis gas being prepared by steam reforming in reactors I through IV.

Reactors I through IV are connected in parallel as concerns introduction of the mixed process gas 6. On the combustion/flue gas side the reactors are arranged in groups of reactors I, II and III, IV. The two reactor groups are connected in series.

Reactors I and II are heated by burning fuel with pressurized air 8. Combustion in reactor I is carried out with excess of air to achieve a suitable combustion temperature and to provide the necessary oxygen content in flue gas 10, which is withdrawn from reactor I and introduced into reactor II for further combustion with fuel. Flue gas 12, withdrawn from reactor II, is cycled to deoxygenator 14 with a bed of conventional oxidation catalyst in order to remove residual amounts of oxygen in the gas. From oxygenator 14, flue gas 4 consisting substantially of nitrogen, carbon dioxide and water is cycled to and admixed with feed gas 2.

Reactors III and IV, being connected in series on the flue gas side, are heated by burning fuel at atmospheric pressure. Flue gas 16, leaving reactor III, is passed to combustion in reactor IV. After having supplied heat to reactor IV, the flue gas is passed to conventional waste heat recovery.

Although the present invention has been described in relation to particular embodiments thereof, many other variations and modifications and other uses will become apparent to those skilled in the art. Therefore, the present invention is to be limited not by the specific disclosure herein, but only by the appended claims.

What is claimed is:

1. A process for the preparation of hydrogen-rich gas in at least a first and a second reforming reactor, each reactor being arranged as an endothermic reactor and having a process gas inlet, a fuel inlet, and a combustion oxidant inlet, the reactors being arranged in parallel with respect to the process gas inlet and the fuel inlet, and in series with respect to the combustion oxidant inlet, the process comprising the steps of:

introducing feedstock gas in parallel to the process gas inlets;

introducing fuel in parallel to the fuel inlets;

supplying combustion air to the combustion oxidant inlet of the first reforming reactor;

removing flue gas from the second reforming reactor;

withdrawing a gas rich in hydrogen from each of the reactors; and controlling a flame temperature in each of the reactors by:
   supplying the combustion air in stoichiometric excess to the first reactor; and
   supplying oxygen-depleted combustion air from the first reactor to the combustion oxidant inlet of the second reactor.

2. The process of claim 1, further comprising the step of mixing a flue gas with the feedstock gas for introduction to the first reforming reactor.

3. The process of claim 1, wherein the flame temperature is maintained below about 1400° C.

4. The process of claim 1, further comprising the step of mixing the feedstock gas with steam.

5. The process of claim 1, further comprising the step of supplying air in an excess of about 105% to the first reactor.

6. The process of claim 1, wherein oxygen-depleted flue gas from the first reactor is supplied as combustion air for the second reactor, so as to limit a flame temperature in the second reactor, an overall air excess in the second reactor being kept to about five percent.

7. The process of claim 1, wherein the combustion air supplied to the first reactor is compressed to a pressure slightly higher than a pressure of the feedstock gas located upstream of the reactors.

8. The process of claim 7, wherein flue gas from the second reactor is expanded to provide at least part of the power required for compression of the air.

9. The process of claim 1, wherein the flue gas consists essentially of $CO_2$, $H_2O$, and $N_2$.

10. The process of claim 1, wherein the flue gas mixed with the feedstock gas is withdrawn from the second reactor.

11. The process of claim 1, wherein the feedstock gas is fed to at least two pairs of reactors, and each pair of reactors is connected to another pair of reactors in series with respect to the combustion oxidant inlet.

12. The process of claim 2, wherein the amount of flue gas mixed with the feedstock gas is selected so as to obtain a predetermined $H_2/N_2$ ratio in the feedstock gas introduced to the first reactor.

13. The process of claim 1, wherein the feedstock gas is desulfurized.

* * * * *